(12) United States Patent
Briggmann et al.

(10) Patent No.: US 11,731,190 B2
(45) Date of Patent: Aug. 22, 2023

(54) METHOD AND MEASURING INSTRUMENT FOR MEASUREMENT OF THE CASTING LEVEL IN A MOULD

(71) Applicant: Berthold Technologies GmbH & Co. KG, Bad Wildbad (DE)

(72) Inventors: Juergen Briggmann, Ammerbuch (DE); Albert Roedfalk, Dalby (SE); Steffen Mueller, Pforzheim (DE); Gerd Reime, Buehl (DE)

(73) Assignee: Berthold Technologies GmbH & Co. KG, Bad Wildbad (DE)

( * ) Notice: Subject to any disclaimer, the term of this patent is extended or adjusted under 35 U.S.C. 154(b) by 0 days.

(21) Appl. No.: 17/457,538

(22) Filed: Dec. 3, 2021

(65) Prior Publication Data
US 2022/0176442 A1    Jun. 9, 2022

(30) Foreign Application Priority Data
Dec. 4, 2020    (DE) ............... 10 2020 215 379.5

(51) Int. Cl.
*B22D 2/00*    (2006.01)
*G01F 23/26*    (2022.01)

(52) U.S. Cl.
CPC ............. *B22D 2/003* (2013.01); *G01F 23/26* (2013.01)

(58) Field of Classification Search
CPC ............. B22D 2/00; B22D 2/003; G01F 23/26
USPC ...... 164/452, 453, 466, 449.1, 450.4, 450.5, 164/151.3
See application file for complete search history.

(56) References Cited

U.S. PATENT DOCUMENTS

| | | |
|---|---|---|
| 5,059,902 A | 10/1991 | Linder |
| 6,517,604 B1 | 2/2003 | Kim et al. |
| 2021/0180936 A1 | 6/2021 | Reime |

FOREIGN PATENT DOCUMENTS

| | | |
|---|---|---|
| DE | 600 33 270 T2 | 2/2008 |
| DE | 10 2018 120 912 A1 | 1/2020 |
| RU | 2 287 782 C1 | 11/2006 |
| WO | WO 2017/089396 A1 | 6/2017 |

OTHER PUBLICATIONS

German-language Office Action issued in German Application No. 10 2020 215 379.5 dated Aug. 17, 2021 (six (6) pages).

*Primary Examiner* — Kevin P Kerns
(74) *Attorney, Agent, or Firm* — Crowell & Moring LLP

(57) ABSTRACT

A method for measurement of the casting level in a mould incudes the steps of: a) impressing a temporal current profile into a transmitting coil that is arranged at the mould, during a measuring time interval; b) measuring a temporal signal profile resulting in a receiving coil during the measuring time interval, wherein the receiving coil is coupled inductively to the transmitting coil; c) selecting a time window within the measuring time interval, and d) evaluating the measured temporal signal profile within the selected time window to determine the casting level.

10 Claims, 3 Drawing Sheets

METHOD AND MEASURING INSTRUMENT FOR MEASUREMENT OF THE CASTING LEVEL IN A MOULD

CROSS REFERENCE TO RELATED APPLICATION

This application claims priority under 35 U.S.C. § 119 from German Patent Application No. 102020215379.5, filed Dec. 4, 2020, the entire disclosure of which is herein expressly incorporated by reference.

BACKGROUND AND SUMMARY OF THE INVENTION

The invention relates to a method and a measuring instrument for measurement of the casting level in a mould.

The invention is based on the object of providing a method and a measuring instrument for measurement of the casting level in a mould that enable a reliable measurement of the casting level.

The method for measurement of the casting level in a mould comprises the following steps:

Step a), namely impressing a defined temporal current profile into a transmitting coil (i.e. causing a defined temporal current profile in the transmitting coil) that is arranged at/on the mould during a measuring time interval;

Step b), namely measuring a temporal signal profile arising in a receiving coil during the measuring time interval, wherein the receiving coil is inductively coupled to the transmitting coil via the mould and its contents;

Step c), namely selecting a time window within the measuring time interval; Step d), namely evaluating the measured temporal signal profile within the selected time window to determine the casting level.

In an embodiment, the temporal signal profile arising in the receiving coil is a temporal voltage profile that is induced in the receiving coil as a result of the temporal current profile impressed into the transmitting coil.

In an embodiment, the predefined temporal current profile is a ramp-shaped, in particular linear ramp-shaped, current profile. The current ramp can, for example, extend from a current magnitude of zero amperes up to a specific maximum current magnitude, wherein the current magnitude is reduced to zero again after reaching the maximum current magnitude. This then results, for example, in a sawtooth current profile.

In an embodiment, the predefined temporal current profile is a non-sinusoidal current profile. The predefined temporal current profile is, in particular, not purely sinusoidal and/or not purely rectangular.

In an embodiment, the method comprises the further following steps: Ascertaining a gradient of the measured temporal signal profile or of the current profile within the selected time window, and evaluating the ascertained gradient to ascertain the casting level.

In an embodiment, impressing the predefined temporal current profile into the transmitting coil during the measuring time interval comprises the following steps: Specifying a temporal current-setpoint-value profile and regulating a current flowing through the transmitting coil to match the temporal current-setpoint-value profile.

In an embodiment, the steps a), c) and d) are repeated continuously, in particular periodically. It is, of course, also possible to repeat the steps a) to d) continuously, in particular periodically.

In an embodiment, the method comprises the further steps of: e) measuring a temporal signal profile arising during the measuring time interval in at least one further receiving coil that is coupled inductively to the transmitting coil via the mould and its contents, and f) evaluating the measured further temporal signal profile within the selected time window to ascertain the casting level.

In an embodiment, the time window within the measuring time interval is selected depending on a geometry of the mould.

The measuring instrument is used for measurement of the casting level in a mould, and comprises: at least one or precisely one transmitting coil, at least one or precisely one receiving coil, at least one controllable current source that is/are designed to effectuate a predefined temporal current profile in the transmitting coil or coils that is/are to be arranged at the mould, a measuring apparatus that is designed to measure a temporal signal profile, in particular a temporal voltage profile, in the receiving coil or coils that is/are coupled inductively to the transmitting coil, and an evaluation apparatus that is designed to evaluate the measured temporal signal profile to ascertain the casting level.

In an embodiment, the measuring instrument is designed to carry out the method described above.

The measurement of the filling level of liquid metal in casting plants (measurement of the casting level) is one of the most important measurements in the casting process. In addition to avoiding overfilling and breakthroughs during the casting process, the fastest, most accurate, most reliable and continuous measurement possible is often also critical for the quality (crystal structure, microstructure) of the end product. Due to the usually high temperatures of liquid metals, the measurement of the casting level is usually only possible without contact.

Electromagnetic measurement on the basis of induced eddy currents has become established for large casting formats (slabs). In contrast to radiometric measurement, this measurement has the advantage that, on the one hand, it does not require a radioactive isotope and, on the other hand, is independent of casting powder or oil that may be present. Disadvantageous with this measuring method, however, is the high sensitivity to the presence of other conductive materials in the vicinity of the sensor system, and their changing electrical properties. Thus the casting moulds are usually complex, metal constructions (coated moulds of copper, receptacles of steel), the tundishes and ladles with the liquid metal are found in the immediate vicinity, while liquid metal is also present in the casting tube and so forth. Temperature variations in particular significantly impair this measurement principle, since the electrical properties, and thereby the eddy current responses, of the materials are highly dependent on temperature. The oscillations of the casting mould necessary for the casting process to prevent caking also have a noticeable disturbing effect in this method. The use of magnetic agitators and brakes, with their very strong electromagnetic fields, also has a disturbing effect on this measuring technology. In the case of large formats, a sensor position is usually found that has a sufficient distance from all the disturbing structures, whose changing influence is therefore small. In the case of small formats, however, everything is so compact that former eddy current methods cannot usefully be employed due to the disturbances just mentioned. A further disadvantage of this method is the very complex calibration which usually cannot be carried out with the liquid metal used for casting, but has to be carried out with substitute materials when cold, as a result of which it is intrinsically not possible to take the temperature-dependent influences of the surroundings into consideration.

In order now to be able also to employ an inductive measuring principle with small casting mould formats, a method is therefore required that is only sensitive in defined spatial regions, i.e. in the regions in which only the liquid metal that is to be measured is found.

Other than is the case with eddy current measurements, the inductive measuring principle according to the invention does not operate with a sinusoidal or rectangular excitation (at one or a plurality of frequencies) of the transmitting coil, but with, for example, a ramp-shaped excitation.

To measure the filling level of liquid metal in moulds according to the invention, a suitable (for example ramp-shaped) current profile is impressed into one or a plurality of transmitting coils appropriately attached to the mould. Using a suitable measurement of the coil current, the current through the transmitting coil(s) is made to track a set value profile exactly. As a result, the temperature-dependent resistance of the transmitting coil(s) has almost no influence any more on the magnetic field generated by the excitation current.

The magnetic field generated in this way now induces a temporal voltage profile in one (or a plurality) of receiving coil(s). If this temporal voltage profile is read in a very high-resistance manner, the voltage profile is independent of the electrical resistance of the receiving coil(s), and thereby of the temperature of the receiving coil(s), since only negligible currents flow in the receiving coils.

If there is no conductive material in the vicinity of the transmitting coil(s) and of the receiving coil(s), then a temporal voltage profile is induced in the receiving coil(s) which, in the case of a ramp-shaped excitation, corresponds to constant voltage. In the presence of conductive materials (metals), this temporal voltage profile is modified depending on the type of material, its quantity and its position in a characteristic manner, as is described, for example, in DE 10 2018 120 912 A1.

It has been found that the modification of the temporal voltage profile along the t-axis (time axis) is correlated to the distance along the z-axis (the spatial axis perpendicular to the coil surface). The maximum range (penetration depth) is determined here by the duration of the excitation ramp and by the magnitude of the current through the excitation coil.

If a suitable region, or a suitable time window along the t-axis, is now chosen for evaluation of the temporal voltage profile, the sensitive region of the measurement can thereby be restricted in such a way that it is only sensitive to the region of the liquid metal that is to be measured. If a suitable parameter of the temporal voltage profile is determined in this time window (this is, for example, the gradient of the temporal voltage profile in the case of a ramp-shaped excitation), this is correlated to the filling level of the liquid metal.

The precise form of the temporal voltage profile depends, inter alia, on the form of the transmitting and receiving coil(s), the position of the coils in the casting mould, the mould itself, and also on the composition of the material to be measured, and can in each case be learnt once or multiple times.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
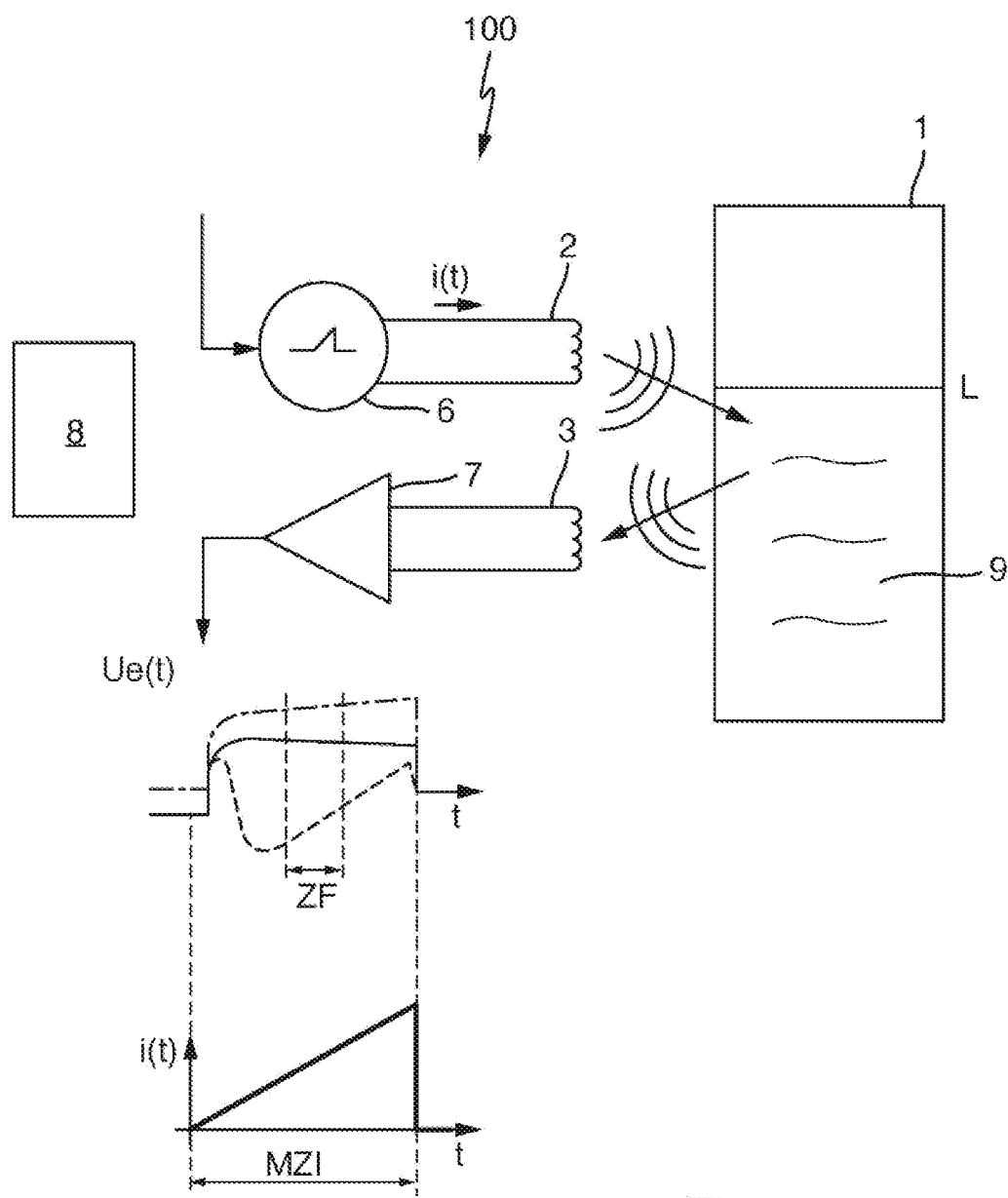
FIG. 1 is a highly schematic block diagram of a measuring instrument according to an embodiment of the invention.

FIG. 1 is a highly schematic block diagram of a measuring instrument 100 for measurement of the casting level of liquid metal or casting metal 9 in a mould 1.

The measuring instrument 100 comprises a transmitting coil 2 that is arranged at/on the mould 1.

The measuring instrument 100 further comprises a receiving coil 3 that is also arranged at/on the mould 1 and which is coupled inductively to the transmitting coil 2 via the mould 1 and the liquid metal 9 which may be located in the mould 1.

The measuring instrument 100 further comprises a regulated current source 6 that is designed to effectuate a temporally linear ramp-shaped current profile i(t) in the transmitting coil 2 during a measuring time interval MZI The measuring instrument 100 further comprises a measuring apparatus 7 that is designed to measure a temporal voltage profile Ue(t) that is induced in the receiving coil 3 as a result of the current profile i(t).

The measuring instrument 100 further comprises an evaluation apparatus 8 that is designed to evaluate the measured temporal voltage profile Ue(t) to ascertain the casting level L.

A time window ZF is selected within the measuring time interval MZI to measure the casting level, and the temporal voltage profile Ue(t) resulting or induced in the receiving coil 3 during the time window ZF is evaluated. The time window ZF within the measuring time interval MZI is selected depending on a geometry of the mould 1.

Figure 2:
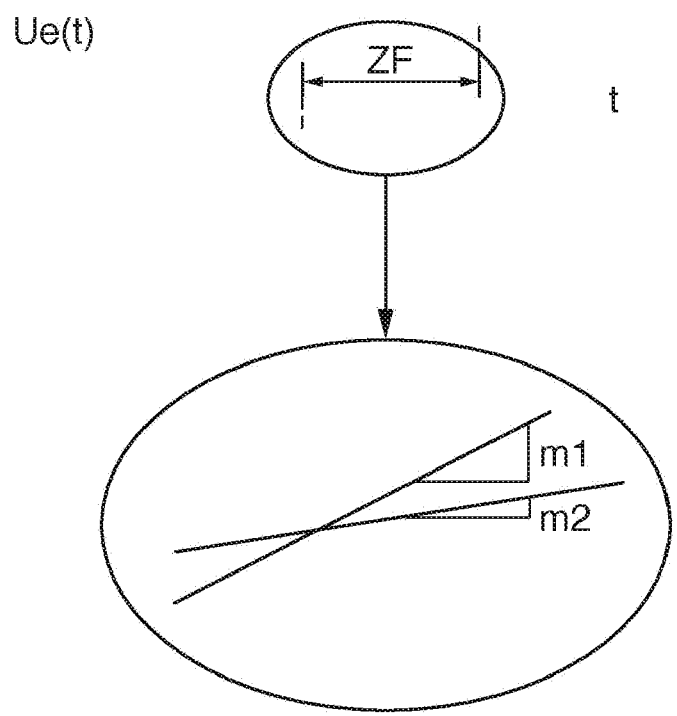
FIG. 2 shows properties of a voltage profile induced in a receiving coil depending on different casting levels.
Figure 4:
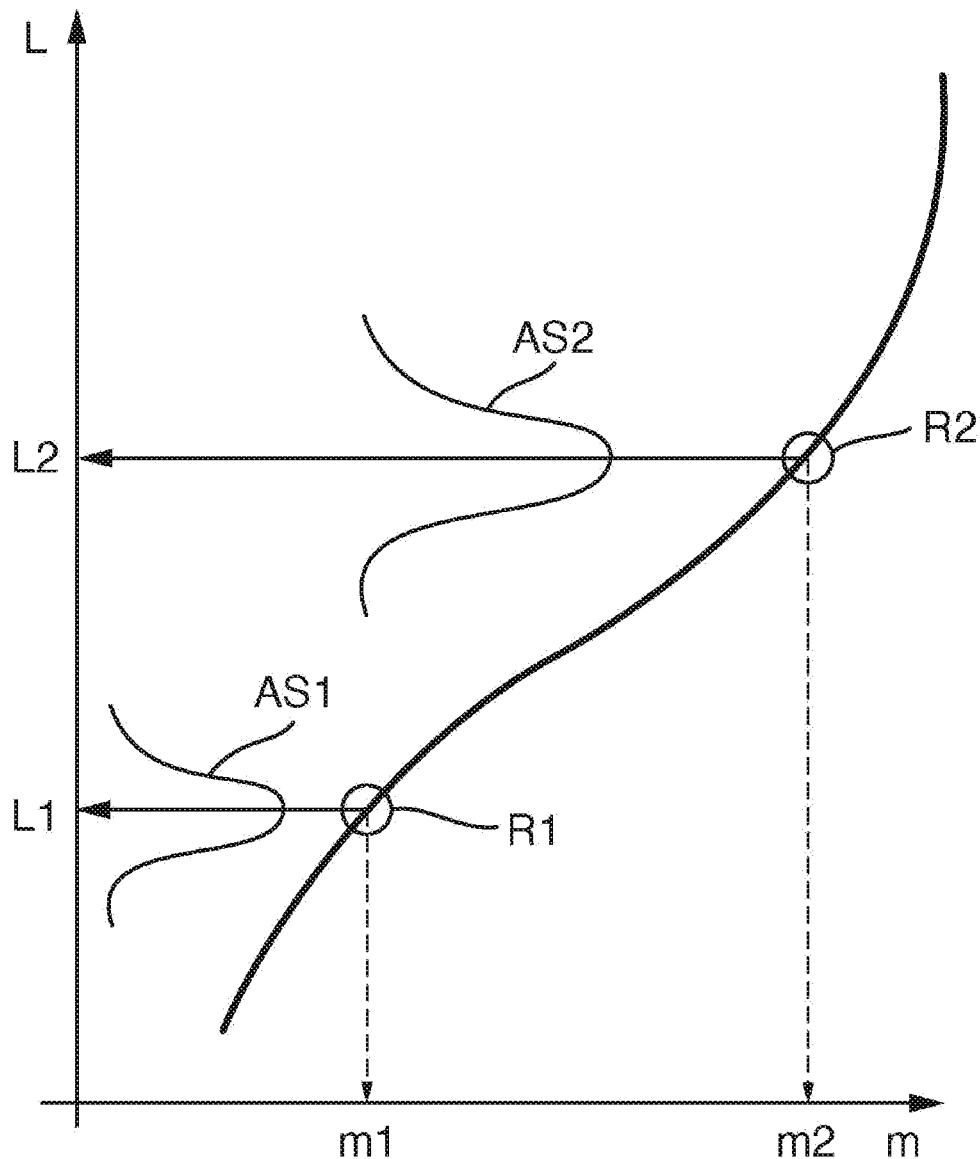
FIG. 4 shows a filling level calibration curve with two reference points that are determined by a differential reading of two receiving coils each.

FIG. 2 shows properties, in the form of a gradient, m1 or m2, of the voltage profile Ue(t) induced in the receiving coil 3 depending on different casting levels L1 or L2—see also FIG. 4. To measure the casting level L, the evaluation unit 8 ascertains the resulting gradient m1 or m2 during the time window ZF, and then ascertains the casting level L depending on the gradient m1 or m2.

The steps described above are repeated continuously for continuous measurement of the casting level L.

Figure 3:
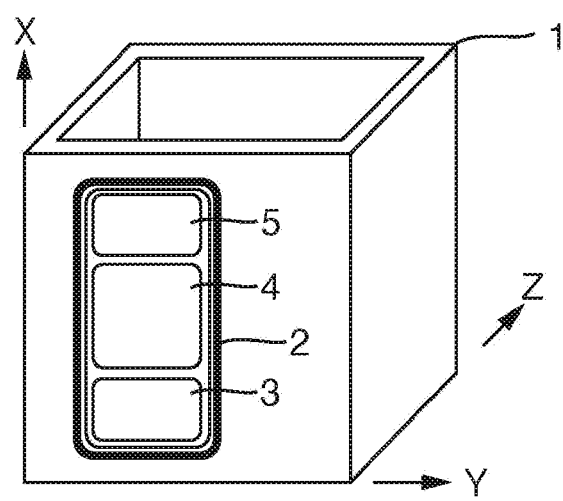
FIG. 3 shows an embodiment of the measuring instrument according to the invention with multiple receiving coils.

FIG. 3 shows an embodiment of the invention in which the measuring instrument 100 comprises three receiving coils 3, 4 and 5. In this embodiment, all of the temporal voltage profiles induced in the receiving coils 3, 4 and 5 during the time window ZF are measured and evaluated.

The precise form of the temporal voltage profile Ue(t) in a respective receiving coil 3, 4 and 5 depends, inter alia, on the form of the transmitting coil 2 and of the receiving coils 3, 4 and 5, the position of the coils 2 to 5 in the casting mould, the mould itself and, to a certain extent, also on the composition of the liquid metal 9 that is to be measured, and must be learned once in each case.

The position and shape of a filling level calibration curve can be subsequently adjusted through the addition of the differentially read receiving coils 4 and 5. It has namely been found that a differential evaluation signal AS1 or AS2, based on receiving coil pairs 3/4 and 4/5, see FIG. 4, reaches a maximum when the filling level L is located precisely between the two differentially read receiving coils of the receiving coil pair 3/4 or 4/5. Since this position is precisely mechanically determined by the known position of the receiving coils 3, 4 and 5, the filling level calibration curve can thus be subsequently adjusted with sufficient accuracy, in particular when sprue casting.

FIG. 4 shows such a filling level calibration curve, in which the filling level L is plotted against the gradient m of the voltage profile Ue(t). The differential signal AS1 between the voltage profiles of the receiving coils 3 and 4 has its maximum at reference point R1, so that at the reference point R1 the gradient m1 can be assigned to a known filling level L1. The differential signal AS2 between the voltage profiles of the receiving coils 4 and 5 has its maximum at reference point R2, so that at the reference point R2 the gradient m2 can be assigned to a known filling level L2.

The invention provides an inductive measuring principle not based on eddy currents for the contactless measurement of filling levels of conductive materials, in particular of liquid metals, in casting moulds with locally selective resolution, and highly independent of temperature.

The invention enables a reliable measurement of the casting level independently of disturbing conductive materials in the vicinity of the coil system, which can, furthermore, be calibrated easily. The invention is also applicable to small casting mould formats, since the sensitive region can easily be specified through the selection of the time window ZF.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for measuring a casting level in a mould, the method comprising the steps of:
    a) impressing a temporal current profile (i(t)) into a transmitting coil that is arranged at the mould, during a measuring time interval (MZI);
    b) measuring a temporal signal profile (Ue(t)) resulting in a receiving coil during the measuring time interval (MZI), wherein the receiving coil is coupled inductively to the transmitting coil;
    c) selecting a time window (ZF) within the measuring time interval; and
    d) evaluating the measured temporal signal profile (Ue(t)) within the selected time window (ZF) to determine the casting level (L);
    wherein the temporal current profile (i(t)) is a non-sinusoidal temporal current profile.

2. The method according to claim 1, wherein
    the temporal signal profile (Ue(t)) resulting in the receiving coil is a temporal voltage profile (Ue(t)) that is induced in the receiving coil as a result of the temporal current profile (i(t)) impressed into the transmitting coil.

3. The method according to claim 1, wherein
    the temporal current profile (i(t)) is a ramp-shaped current profile.

4. The method according to claim 3, wherein
    the ramp-shaped current profile is a linear ramp-shaped current profile.

5. The method according to claim 1, further comprising:
    ascertaining a gradient (m1, m2) of the measured temporal signal profile (Ue(t)) within the selected time window; and
    evaluating the ascertained gradient (m1, m2) to ascertain the casting level (L).

6. The method according to claim 1, wherein the impressing of the temporal current profile (i(t)) into the transmitting coil during the measuring time interval comprises the steps of:
    specifying a temporal current-setpoint profile; and
    regulating a current (i(t)) flowing through the transmitting coil to track the temporal current-setpoint profile.

7. The method according to claim 1, wherein
    the steps a), c) and d) are repeated continuously.

8. The method according to claim 1, wherein
    the steps a), c) and d) are repeated periodically.

9. The method according to claim 1, further comprising the steps of:
    e) measuring a further temporal signal profile arising during the measuring time interval (MZI) in at least one further receiving coil that is coupled inductively to the transmitting coil; and
    f) evaluating the measured further temporal signal profile within the selected time window (ZF) to determine the casting level (L).

10. The method according to claim 1, wherein
    the time window (ZF) within the measuring time interval (MZI) is selected depending on a geometry of the mould.

\* \* \* \* \*